(12) United States Patent　　　　(10) Patent No.:　US 12,625,250 B2
Okita　　　　　　　　　　　　　　(45) Date of Patent:　May 12, 2026

(54) VEHICLE SPEED CALCULATION DEVICE

(71) Applicant: TOYOTA JIDOSHA KABUSHIKI KAISHA, Toyota (JP)

(72) Inventor: Toshinori Okita, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 262 days.

(21) Appl. No.: 18/519,553

(22) Filed: Nov. 27, 2023

(65) Prior Publication Data

US 2024/0255632 A1　　Aug. 1, 2024

(30) Foreign Application Priority Data

Feb. 1, 2023　(JP) ................................. 2023-014193

(51) Int. Cl.
*G01S 13/60*　　　(2006.01)
*G01S 13/931*　　(2020.01)

(52) U.S. Cl.
CPC ............ *G01S 13/60* (2013.01); *G01S 13/931* (2013.01); *G01S 2013/932* (2020.01)

(58) Field of Classification Search
CPC .... G01S 7/4026; G01S 7/4034; G01S 7/4056; G01S 13/931; G01S 13/60; G01S 2013/932
USPC .......................................... 342/70, 174, 105
See application file for complete search history.

(56) References Cited

U.S. PATENT DOCUMENTS

| | | | | |
|---|---|---|---|---|
| 6,311,123 | B1 * | 10/2001 | Nakamura | G01S 13/931 123/352 |
| 6,429,804 | B1 * | 8/2002 | Kishida | G01S 13/34 342/146 |
| 6,567,737 | B2 * | 5/2003 | Nakamura | G01S 13/931 342/107 |
| 6,670,912 | B2 * | 12/2003 | Honda | G01S 13/931 348/700 |
| 6,684,149 | B2 * | 1/2004 | Nakamura | B60W 30/16 180/170 |
| 8,558,733 | B2 * | 10/2013 | Kamo | G01S 13/42 342/70 |
| 9,053,554 | B2 * | 6/2015 | Uchida | G06T 7/20 |
| 9,097,801 | B2 * | 8/2015 | Kambe | G01S 13/931 |
| 9,435,883 | B2 * | 9/2016 | Moriuchi | G01S 7/03 |
| 9,606,225 | B2 * | 3/2017 | Okita | G01S 13/931 |
| 10,180,494 | B2 * | 1/2019 | Kuehnle | H01Q 1/32 |
| 10,427,689 | B2 | 10/2019 | Tokimasa et al. | |
| 10,486,698 | B2 | 11/2019 | Masui et al. | |

(Continued)

FOREIGN PATENT DOCUMENTS

| | | | |
|---|---|---|---|
| JP | 2000-081480 | A | 3/2000 |
| JP | 2004-198438 | A | 7/2004 |

(Continued)

*Primary Examiner* — Michael W Justice
(74) *Attorney, Agent, or Firm* — SoraIP, Inc.

(57)　　　　　　　ABSTRACT

The vehicle speed calculation device includes a target category determination unit, a vehicle speed calculation unit, a positional relationship calculation unit, and a vehicle speed correction unit. The positional relationship calculation unit calculates the positional relationship between the vehicle and the fixed target in a height direction. The vehicle speed correction unit increases, when the target is an object on a road, degree of correction of the vehicle speed using the relative vehicle speed compared to when the target is an upper object.

12 Claims, 6 Drawing Sheets

(56)          References Cited

U.S. PATENT DOCUMENTS

| | | | | |
|---|---|---|---|---|
| 10,583,737 | B2 | 3/2020 | Chiba et al. | |
| 10,793,147 | B2 | 10/2020 | Kaminade et al. | |
| 10,802,140 | B2 * | 10/2020 | Aoki | G01S 13/931 |
| 10,922,561 | B2 | 2/2021 | Ozawa et al. | |
| 11,072,328 | B2 | 7/2021 | Masui et al. | |
| 11,131,769 | B2 | 9/2021 | Mizuno et al. | |
| 11,199,619 | B2 * | 12/2021 | Kishigami | G01S 13/42 |
| 11,235,766 | B2 | 2/2022 | Masui et al. | |
| 11,247,671 | B2 | 2/2022 | Komori et al. | |
| 11,454,718 | B2 * | 9/2022 | Westerhoff | G01S 13/89 |
| 11,536,825 | B2 * | 12/2022 | Green | B61L 23/041 |
| 12,046,143 | B2 * | 7/2024 | Zhang | G01S 13/52 |
| 12,072,438 | B2 * | 8/2024 | Lee | G01S 7/4034 |
| 12,158,539 | B2 * | 12/2024 | Brosche | G01S 7/415 |
| 12,510,656 | B2 * | 12/2025 | Dvorecki | G01S 7/417 |
| 2002/0016663 | A1 * | 2/2002 | Nakamura | B60W 30/16 |
| | | | | 180/170 |
| 2002/0032515 | A1 * | 3/2002 | Nakamura | G01S 13/931 |
| | | | | 701/96 |
| 2003/0011509 | A1 * | 1/2003 | Honda | G06V 10/255 |
| | | | | 342/72 |
| 2009/0027180 | A1 * | 1/2009 | Shibata | G01S 7/41 |
| | | | | 340/435 |
| 2011/0221628 | A1 * | 9/2011 | Kamo | G01S 7/295 |
| | | | | 342/123 |
| 2013/0002470 | A1 * | 1/2013 | Kambe | G01S 13/931 |
| | | | | 342/55 |

| | | | | |
|---|---|---|---|---|
| 2015/0015434 | A1 * | 1/2015 | Okita | G01S 13/04 |
| | | | | 342/27 |
| 2015/0057833 | A1 * | 2/2015 | Moriuchi | G01S 7/03 |
| | | | | 343/893 |
| 2015/0204972 | A1 * | 7/2015 | Kuehnle | G01S 13/42 |
| | | | | 342/156 |
| 2018/0203109 | A1 * | 7/2018 | Aoki | G01S 13/36 |
| 2019/0101621 | A1 * | 4/2019 | Machida | G01S 13/931 |
| 2020/0191938 | A1 * | 6/2020 | Green | B61L 25/021 |
| 2020/0225337 | A1 * | 7/2020 | Kishigami | G01S 7/41 |
| 2020/0408897 | A1 * | 12/2020 | Westerhoff | G01S 13/89 |
| 2021/0165074 | A1 * | 6/2021 | Brosche | G01S 7/4026 |
| 2021/0349183 | A1 * | 11/2021 | Lee | G01S 7/40 |
| 2021/0364631 | A1 | 11/2021 | Hasegawa et al. | |
| 2022/0113402 | A1 * | 4/2022 | Dvorecki | G01S 7/417 |
| 2022/0229153 | A1 * | 7/2022 | Fassbender | G01S 13/89 |
| 2022/0319328 | A1 * | 10/2022 | Zhang | G06V 20/56 |
| 2023/0305132 | A1 * | 9/2023 | Subburaj | G01S 13/343 |
| 2023/0384418 | A1 * | 11/2023 | Jeannin | G01S 13/584 |
| 2023/0391348 | A1 * | 12/2023 | Moon | B60W 50/0225 |
| 2024/0134008 | A1 * | 4/2024 | Yanik | G01S 13/42 |
| 2024/0230841 | A9 * | 7/2024 | Yanik | G01S 13/584 |

FOREIGN PATENT DOCUMENTS

| | | |
|---|---|---|
| JP | 2013-156147 A | 8/2013 |
| JP | 6832166 B2 | 2/2021 |
| WO | 2013/114171 A1 | 8/2013 |

\* cited by examiner

VEHICLE SPEED CALCULATION DEVICE

CROSS-REFERENCE TO RELATED APPLICATION

This application claims priority to Japanese Patent Application No. 2023-014193 filed on Feb. 1, 2023, incorporated herein by reference in its entirety.

BACKGROUND

1. Technical Field

The present disclosure relates to a vehicle speed calculation device.

2. Description of Related Art

Conventionally, Japanese Patent No. 6832166 (JP 6832166 B) is known as a technical document related to a vehicle speed calculation device. JP 6832166 B discloses a technique that corrects a detected own vehicle speed detected by a vehicle speed sensor using a relative speed of a target that is detected by a radar sensor.

SUMMARY

In the conventional technique as described above, angular resolution of the radar sensor in the vertical direction of a vehicle may be relatively rough. Therefore, for example, when the target is an upper object, as a result of deterioration in detection accuracy of a vertical detection angle of the target, there is a possibility that correction accuracy of a vehicle speed deteriorates.

An object of the present disclosure is to provide a vehicle speed calculation device that enables to suppress deterioration in the correction accuracy of the vehicle speed.

The vehicle speed calculation device of the present disclosure is a vehicle speed calculation device that calculates a vehicle speed of a vehicle, the vehicle speed calculation device including a target category determination unit that determines whether a fixed target present in front of the vehicle is an object on a road or an upper object, based on a received electric power of a radar sensor of the vehicle, a vehicle speed calculation unit that calculates a vehicle speed of the vehicle, based on a detection result of a wheel speed sensor of the vehicle, a positional relationship calculation unit that calculates a positional relationship between the vehicle and the fixed target, based on a detection result of the radar sensor, and a vehicle speed correction unit that corrects the vehicle speed, based on a relative speed of the fixed target with respect to the vehicle that is detected by the radar sensor and the positional relationship. The positional relationship calculation unit calculates, when the fixed target is an object on a road, the positional relationship between the vehicle and the fixed target in a height direction based on an installation height of the radar sensor from a road surface, and the positional relationship calculation unit calculates, when the fixed target is an upper object, the positional relationship between the vehicle and the fixed target in the height direction, based on a vertical detection angle of the fixed target that is detected by the radar sensor, or a vertical detection angle range of the radar sensor and a front-rear distance of the fixed target at timing that the fixed target is lost from the vertical detection angle range. The vehicle speed correction unit increases, when the fixed target is an object on a road, degree of correction of the vehicle speed using the relative speed and the positional relationship compared to when the fixed target is an upper object.

According to the present disclosure, it is possible to provide a vehicle speed calculation device that is able to suppress deterioration in the correction accuracy of the vehicle speed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings.

Figure 1:
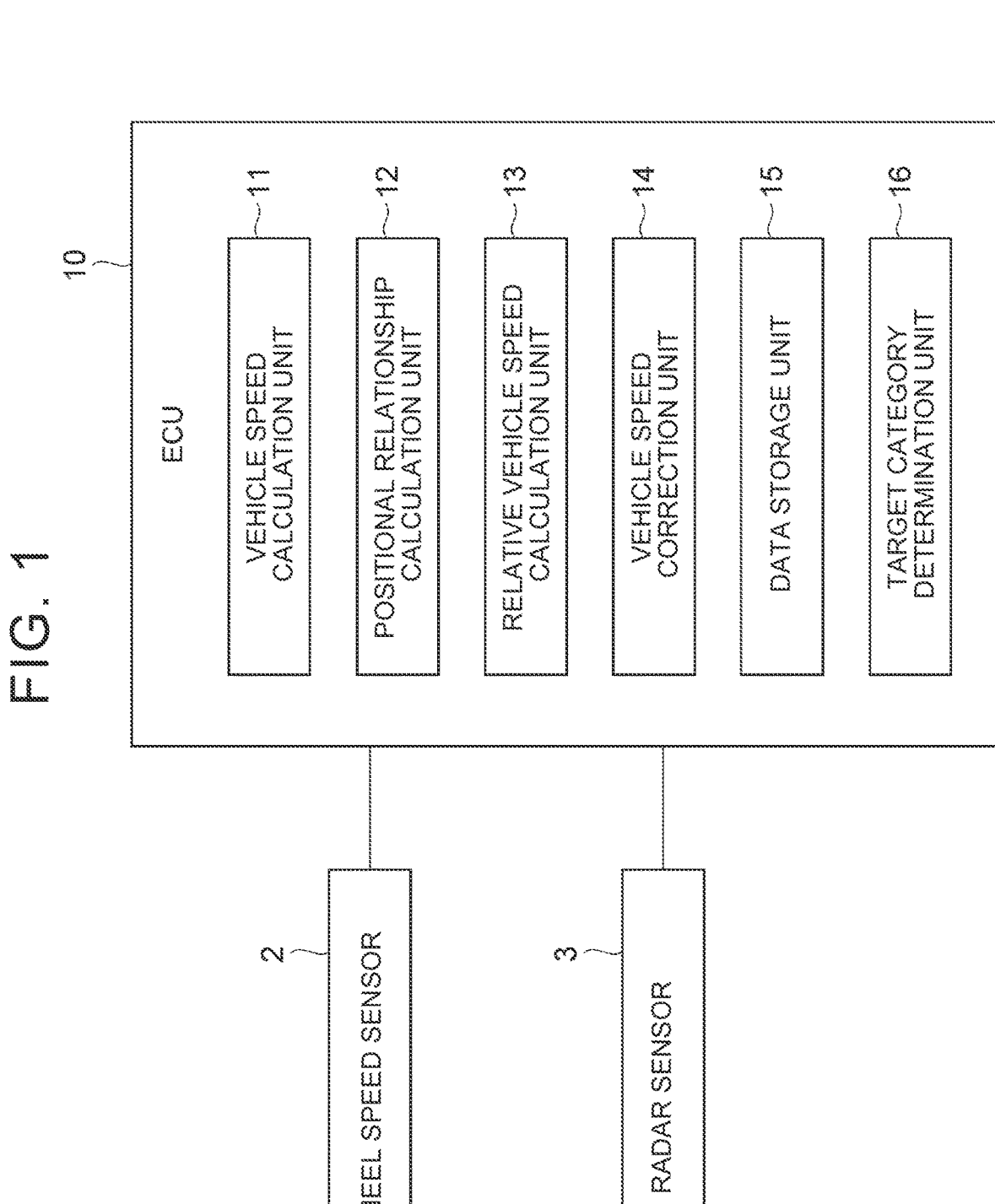
FIG. 1 is a block diagram of a vehicle speed calculation device according to one embodiment.

FIG. 1 is a block diagram of a vehicle speed calculation device according to one embodiment. As shown in FIG. 1, the vehicle speed calculation device 1 includes a wheel speed sensor 2, a radar sensor 3, and an Electronic Control Unit (ECU) 10. A vehicle speed calculation device 1 calculates the vehicle speed of a vehicle 8 (see FIG. 2).

Figure 2:
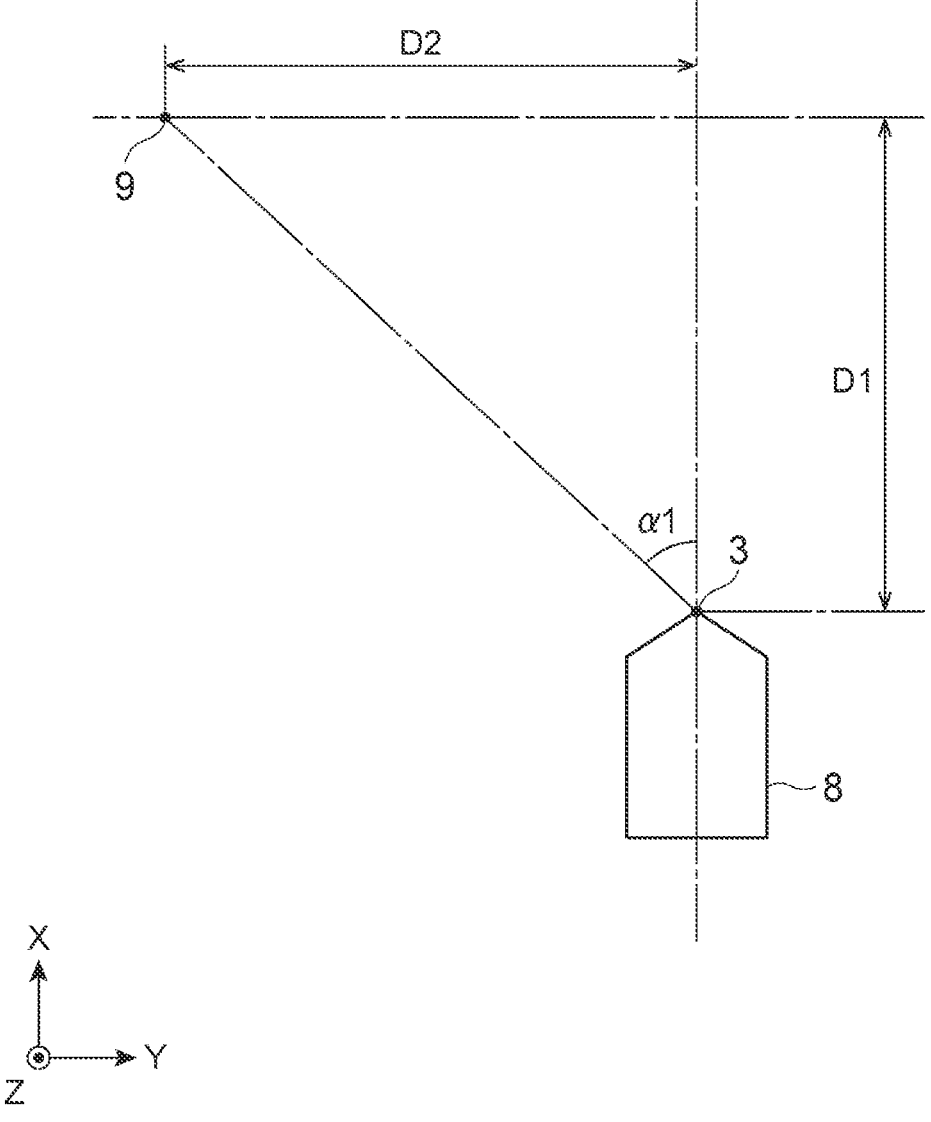
FIG. 2 is a plan view for explaining the positional relationship between the vehicle and the target.

The wheel speed sensor 2 is provided for a wheel, drive shaft, or the like of a vehicle 8 (see FIG. 2). The drive shaft rotates integrally with the wheel. The wheel speed sensor 2 detects the rotational speed of the wheels of the vehicle 8. The wheel speed sensor 2 transmits the detection result to the ECU 10.

Figure 3:
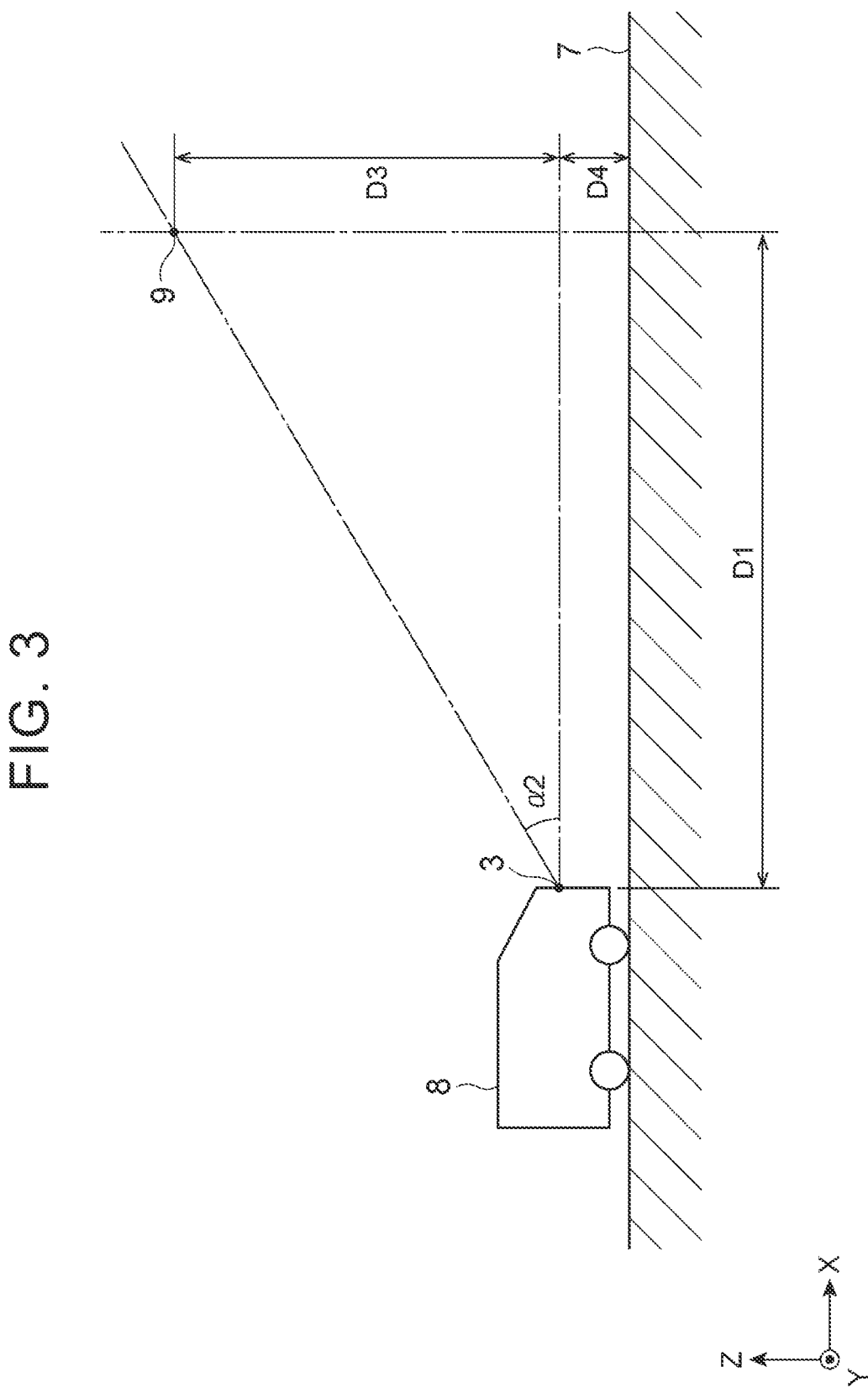
FIG. 3 is a side view for explaining the positional relationship between the vehicle and the target.

As shown in FIGS. 2 and 3, the radar sensor 3 is provided at the front end of the vehicle 8. The radar sensor 3 is provided at a substantially central position of the vehicle 8 in the left-right direction. The radar sensor 3 is provided on the vehicle 8 at a predetermined distance from the road surface 7. The installation height D4 of the radar sensor 3 from the road surface 7 is pre-stored in the storage unit of the ECU 10. The radar sensor 3 emits radio waves or light toward the front of the vehicle 8. The radar sensor 3 detects the fixed target 9 by receiving radio waves or light reflected by the fixed target 9 existing in front of the vehicle 8. A fixed target 9 is an object whose position is fixed with respect to the road. The radar sensor 3 is, for example, a millimeter wave radar.

The radar sensor 3 detects the relative speed of the fixed target 9 with respect to the vehicle 8. The direction of the relative speed of the fixed target 9 is parallel to the virtual line connecting the radar sensor 3 and the fixed target 9. The radar sensor 3 detects the relative distance of the fixed target 9 with respect to the vehicle 8. The relative distance of the fixed target 9 is the length of a virtual line connecting the radar sensor 3 and the fixed target 9 with a straight line. The radar sensor 3 detects the left-right detection angle α1 of the fixed target 9. The left-right detection angle α1 is the angle formed by the virtual line connecting the radar sensor 3 and the fixed target 9 with respect to the X-axis when viewed from the Z-axis direction (vertical direction of the vehicle 8). The radar sensor 3 detects the vertical detection angle $\alpha2$ of the fixed target 9. The vertical detection angle $\alpha2$ is an angle formed by an imaginary line connecting the radar sensor 3 and the fixed target 9 with respect to the X axis when viewed from the Y axis direction (horizontal direction of the vehicle 8). The angular resolution of the radar sensor 3 on the XZ plane is coarser than the angular resolution of the radar sensor 3 on the XY plane. That is, the detection accuracy of the vertical detection angle $\alpha2$ by the radar sensor 3 is lower than the detection accuracy of the horizontal detection angle $\alpha1$ by the radar sensor 3. The radar sensor 3 transmits detection results to the ECU 10.

The ECU 10 is an electronic control unit having a Central Processing Unit (CPU) and a memory. The storage unit is, for example, Read Only Memory (ROM) or Random Access Memory (RAM). In the ECU 10, for example, various functions are realized by the CPU executing programs stored in the storage unit.

The ECU 10 has a functional configuration including a vehicle speed calculation unit 11, a positional relationship calculation unit 12, a relative vehicle speed calculation unit 13, a vehicle speed correction unit 14, a data storage unit 15, and a target category determination unit 16.

The vehicle speed calculation unit 11 calculates the vehicle speed of the vehicle 8 based on the detection result of the wheel speed sensor 2. The vehicle speed calculation unit 11 calculates the vehicle speed of the vehicle 8 based on the diameter of the wheel stored in advance and the rotational speed of the wheel transmitted from the wheel speed sensor 2.

Figure 4:
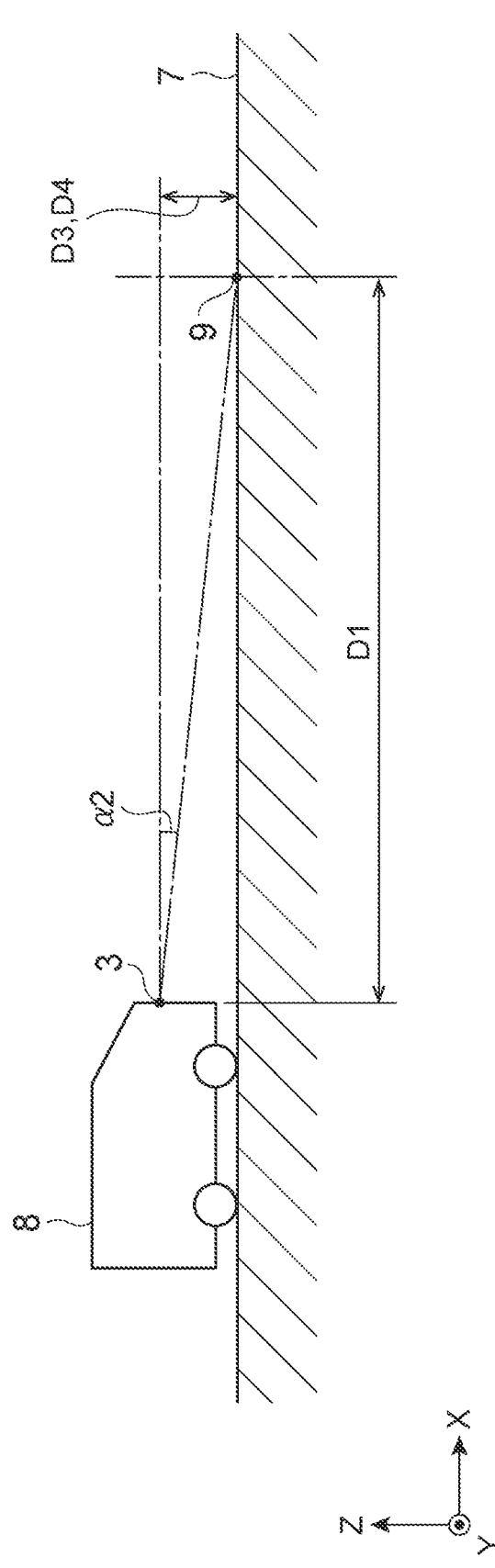
FIG. 4 is a side view for explaining the positional relationship between the vehicle and the target.

The positional relationship calculation unit 12 calculates the positional relationship (hereinafter simply referred to as "positional relationship") between the vehicle 8 and the fixed target 9 based on the detection result of the radar sensor 3. The positional relationship is the relative position of the vehicle 8 and the fixed target 9 in the three-dimensional space. The positional relationship includes the height direction positional relationship between the vehicle 8 and the fixed target 9. 2 to 4 are diagrams for explaining the positional relationship between the vehicle and the target. As shown in FIGS. 2 to 4, the positional relationship includes a front-rear distance D1 of the fixed target 9, a right-left distance D2 of the fixed target 9, and a vertical distance D3 of the fixed target 9. The front-rear distance D1 is the distance between the radar sensor 3 and the fixed target 9 in the X-axis direction (the longitudinal direction of the vehicle 8). The front-rear distance D1 is the distance between the vehicle 8 and the fixed target 9 in the X-axis direction. The right-left distance D2 is the distance between the radar sensor 3 and the fixed target 9 in the Y-axis direction. The vertical distance D3 of the fixed target 9 is the distance between the radar sensor 3 and the fixed target 9 in the Z-axis direction.

As shown in FIGS. 2 and 3, when the fixed target 9 is an upper object, the vertical distance D3 of the fixed target 9 is often unknown. The positional relationship calculation unit 12 calculates the positional relationship based on the vertical detection angle $\alpha2$ and the like when the fixed target 9 is an upper object. Specifically, the positional relationship calculation unit 12 calculates the relative distance of the fixed target 9 (the length of the imaginary line connecting the radar sensor 3 and the fixed target 9 with a straight line), the horizontal detection angle $\alpha1$, and the vertical detection angle $\alpha2$. Based on this, the positional relationship is calculated. When the fixed target 9 is an upper object, the positional relationship calculation unit 12 calculates the position when the front-rear distance D1 is large enough to reduce the influence of the vertical distance D3 (when the front-rear distance D1 is greater than a predetermined value). Relationships may be calculated. The predetermined value for the front-rear distance D1 is a value that is predetermined based on the general height of an upper object or the like. The upper object is located above the vehicle 8 in the Z-axis direction. Upper objects are, for example, traffic lights, road signs, road lighting, viaducts or footbridges.

As shown in FIG. 4, when the fixed target 9 is an object on the road, the vertical distance D3 of the fixed target 9 substantially matches the installation height D4 of the radar sensor 3 from the road surface 7. When the fixed target 9 is an object on the road (when the vertical distance D3 of the fixed target 9 is known), the positional relationship calculation unit 12 does not based on the vertical detection angle $\alpha2$, but based on the installation height D4, etc. to calculate the positional relationship. Specifically, the positional relationship calculation unit 12 calculates the relative distance of the fixed target 9 (the length of the imaginary line connecting the radar sensor 3 and the fixed target 9 with a straight line), the left-right detection angle $\alpha1$, and the installation height D4. Based on this, the positional relationship is calculated. When the fixed target 9 is an object on the road, the positional relationship calculation unit 12 determines that the front-rear distance D1 is close enough to ignore the influence of the road surface gradient (when the front-rear distance D1 is shorter than a predetermined value). Also, the positional relationship may be calculated. The predetermined value for the front-rear distance D1 is a predetermined value based on a general road surface gradient or the like. Objects on the road are provided on the road surface 7. Objects on the road are, for example, road iron plates, manhole covers, joints of bridges, railroad tracks, and the like. The road iron plate is, for example, an iron plate for construction laid on the road surface 7 or the like.

The relative vehicle speed calculation unit 13 calculates the relative vehicle speed of the vehicle 8 based on the relative speed of the fixed target 9 detected by the radar sensor 3 and the positional relationship. The direction of the relative vehicle speed is parallel to the X-axis direction (traveling direction of the vehicle 8). Thus, the relative vehicle speed of the vehicle 8 is the traveling speed of the vehicle 8 calculated based on the relative speed and positional relationship of the fixed target 9 with respect to the vehicle 8.

The vehicle speed correction unit 14 corrects the vehicle speed calculated by the vehicle speed calculation unit 11 based on the relative speed of the fixed target 9 with respect to the vehicle 8 detected by the radar sensor 3 and the positional relationship. Specifically, the vehicle speed correction unit 14 corrects the vehicle speed calculated by the vehicle speed calculation unit 11 using the relative vehicle speed calculated by the relative vehicle speed calculation unit 13. The vehicle speed correction unit 14 adjusts the ratio of the vehicle speed calculated by the vehicle speed calculation unit 11 and the relative vehicle speed calculated by the relative vehicle speed calculation unit 13 to the vehicle speed.

Specifically, the vehicle speed correction unit 14 calculates the vehicle speed after correction based on the formula $V=f1*V1+f2*V2$, for example. V1 is the vehicle speed (vehicle speed before correction) calculated by the vehicle speed calculation unit 11, f1 is the first correction coefficient, V2 is the relative vehicle speed calculated by the relative vehicle speed calculation unit 13, f2 is the second correction coefficient, and V is the corrected vehicle speed. That is, the vehicle speed correction unit 14 calculates the multiplication value of the vehicle speed V1 calculated by the vehicle speed calculation unit 11 and the first correction coefficient f1, and the relative vehicle speed V2 calculated by the relative vehicle speed calculation unit 13 and the second The corrected vehicle speed V is calculated by summing the multiplied values with the correction coefficient f2. The total value of the first correction coefficient f1 and the second correction coefficient f2 is 1, for example.

The vehicle speed correction unit 14 increases the degree of correction of the vehicle speed V1 using the relative vehicle speed V2 when the fixed target 9 is an object on the road compared to when the fixed target 9 is an upper object. Specifically, the vehicle speed correction unit 14 increases the second correction coefficient f2 when the fixed target 9 is an object on the road compared to when the fixed target 9 is an upper object. As an example, when the fixed target 9 is an upper object, the vehicle speed correction unit 14 uses 0.9 as the first correction coefficient f1 and 0.1 as the second correction coefficient f2. When 9 is an object on the road, 0.1 is used as the first correction coefficient f1 and 0.9 is used as the second correction coefficient f2. In this manner, the vehicle speed correction unit 14 increases the degree of the influence on the relative vehicle speed V2 on the vehicle speed V when the fixed target 9 is an object on the road compared to when the fixed target 9 is an upper object.

The data storage unit 15 accumulates various kinds of information. The data storage unit 15 buffers various data. The data storage unit 15 accumulates the relative speed of the fixed target 9 detected by the radar sensor 3, the relative distance (or the front-rear distance D1) of the fixed target 9, the horizontal detection angle $\alpha 1$, and the vertical detection angle $\alpha 2$ over time. The data storage unit 15 accumulates the vehicle speed calculated by the vehicle speed calculation unit 11 and the positional relationship calculated by the positional relationship calculation unit 12 over time. The data storage unit 15 stores the relative vehicle speed calculated by the relative vehicle speed calculation unit 13 over time.

The data storage unit 15 does not need to accumulate the relative vehicle speed calculated by the relative vehicle speed calculation unit 13 for each calculation cycle. If the fixed target 9 is an object on the road, the data storage unit 15 may store the relative vehicle speed only when the front-rear distance D1 is small (when the front-rear distance D1 is smaller than a predetermined value) enough that the influence of the road surface gradient need not be considered. When the fixed target 9 is an upper object, the data storage unit 15 may store the relative vehicle speed only when the front-rear distance D1 is large (when the front-rear distance D1 is larger than a predetermined value) enough to be able to reduce the influence of the vertical distance D3.

Figure 5:
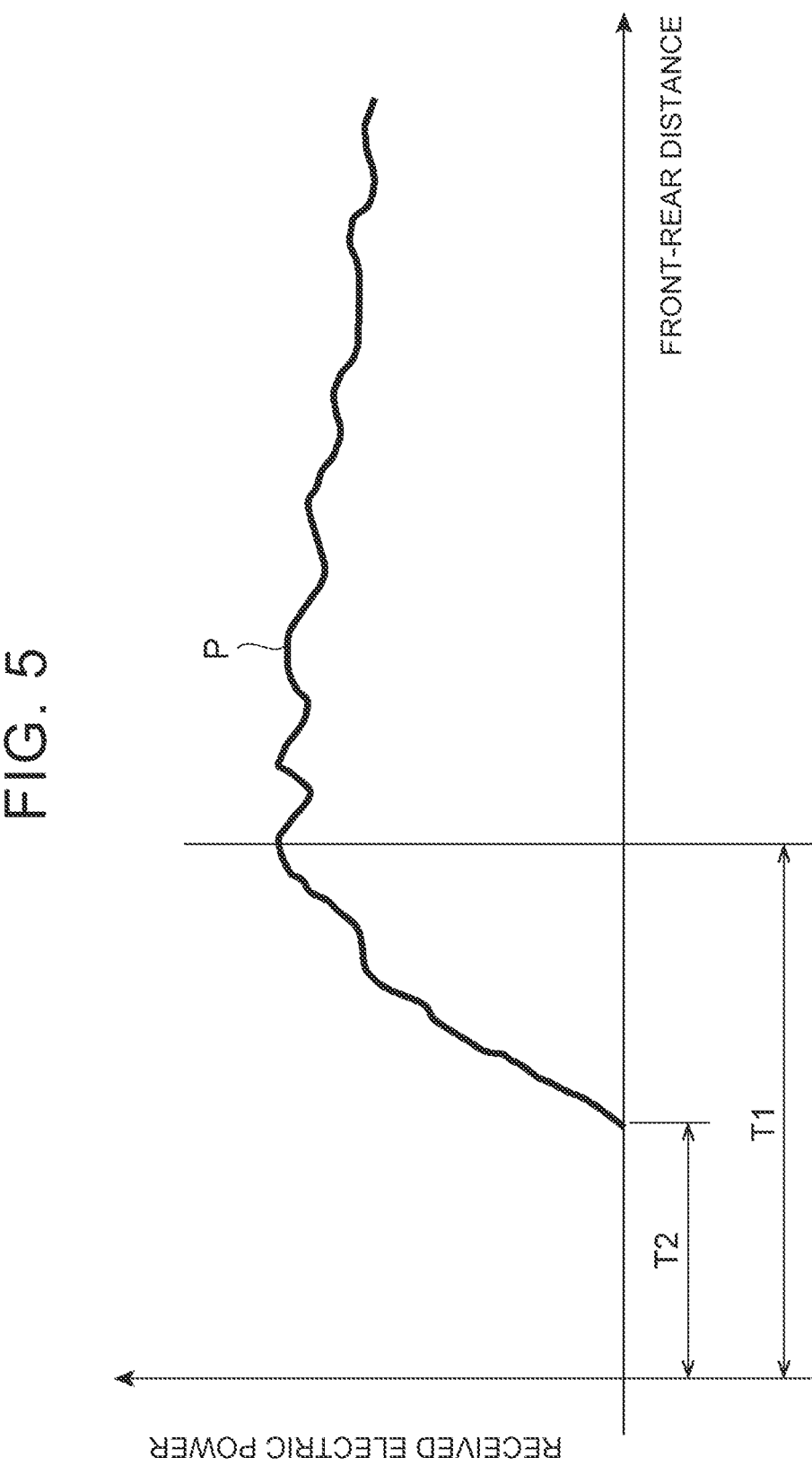
FIG. 5 is a diagram showing changes over time in received electric power of a radar sensor.

The data storage unit 15 accumulates information on the received electric power of the radar sensor 3 over time. FIG. 5 is a diagram showing temporal changes in received electric power of the radar sensor 3 when the fixed target 9 is an upper object. As shown in FIG. 5, the received electric power P corresponding to the fixed target 9 gradually increases and then decreases as the front-rear distance D1 decreases. The received electric power P starts to decrease at the timing when the front-rear distance D1 reaches the decrease start distance T1, and disappears at the timing when the front-rear distance D1 reaches the disappearance distance T2. The data storage unit 15 continues to accumulate information on the received electric power P until the received electric power P for the fixed target 9 disappears or until the vehicle 8 passes the fixed target 9 (the front-rear distance D1 becomes zero). Each of the decrease start distance T1 and the disappearance distance T2 correlates with the height of the fixed target 9. Each of the decrease start distance T1 and the disappearance distance T2 increases as the height of the fixed target 9 increases. That is, the received electric power P starts to decrease at an earlier timing and disappears at an earlier timing as the height of the fixed target 9 increases.

Based on the received electric power P of the radar sensor 3, the target category determination unit 16 determines whether the fixed target 9 is an object on the road or an upper object. The target category determination unit 16 determines the information of the received electric power P accumulated during the period until the received electric power P for the fixed target 9 disappears or until the vehicle 8 passes the fixed target 9. Based on this, it is determined whether the fixed target 9 is an object on the road or an upper object. The target category determination unit 16 determines whether the fixed target 9 is an object on the road based on, for example, the method described in Japanese Unexamined Patent Application Publication No. 2013-156147 (JP 2013-156147 A).

The target category determination unit 16 determines that the fixed target 9 is an upper object, when the front-rear distance D1 of the fixed target 9 at the timing at which the received electric power P has disappeared (disappearance distance T2) is equal to or greater than a predetermined value, the decrease rate of the received electric power P before disappearance with respect to the front-rear distance D1 of the fixed target 9 is equal to or greater than a predetermined value, the decrease rate of the relative speed of the fixed target 9 with respect to the front-rear distance D1 of the fixed target 9 is a predetermined value or more, and the fixed target 9 is within the right-left detection range of the radar sensor 3 or the right-left distance D2 of the fixed target 9 is equal to or less than a predetermined value. The decrease rate of the received electric power P before disappearance is, for example, a division value $(\Delta P/(T1-T2))$ obtained by dividing the amount of change in the received electric power P by the difference between the decrease start distance T1 and the disappearance distance T2. The relative speed of the fixed target 9 is the product of the cosine of the detection angle of the fixed target 9 (the angle formed by the virtual line connecting the radar sensor 3 and the fixed target 9 with respect to the X-axis) and the relative vehicle speed, and tends to decrease sharply just before the received electric power P disappears. Each of the predetermined value regarding the disappearance distance T2, the predetermined value regarding the decrease rate of the received electric power P before disappearance, the predetermined value regarding the decrease rate of the relative speed of the fixed target 9, and the predetermined value regarding the right-left distance D2 of the fixed target 9 is generally a predetermined value based on the height of an upper object, for example.

Figure 6:
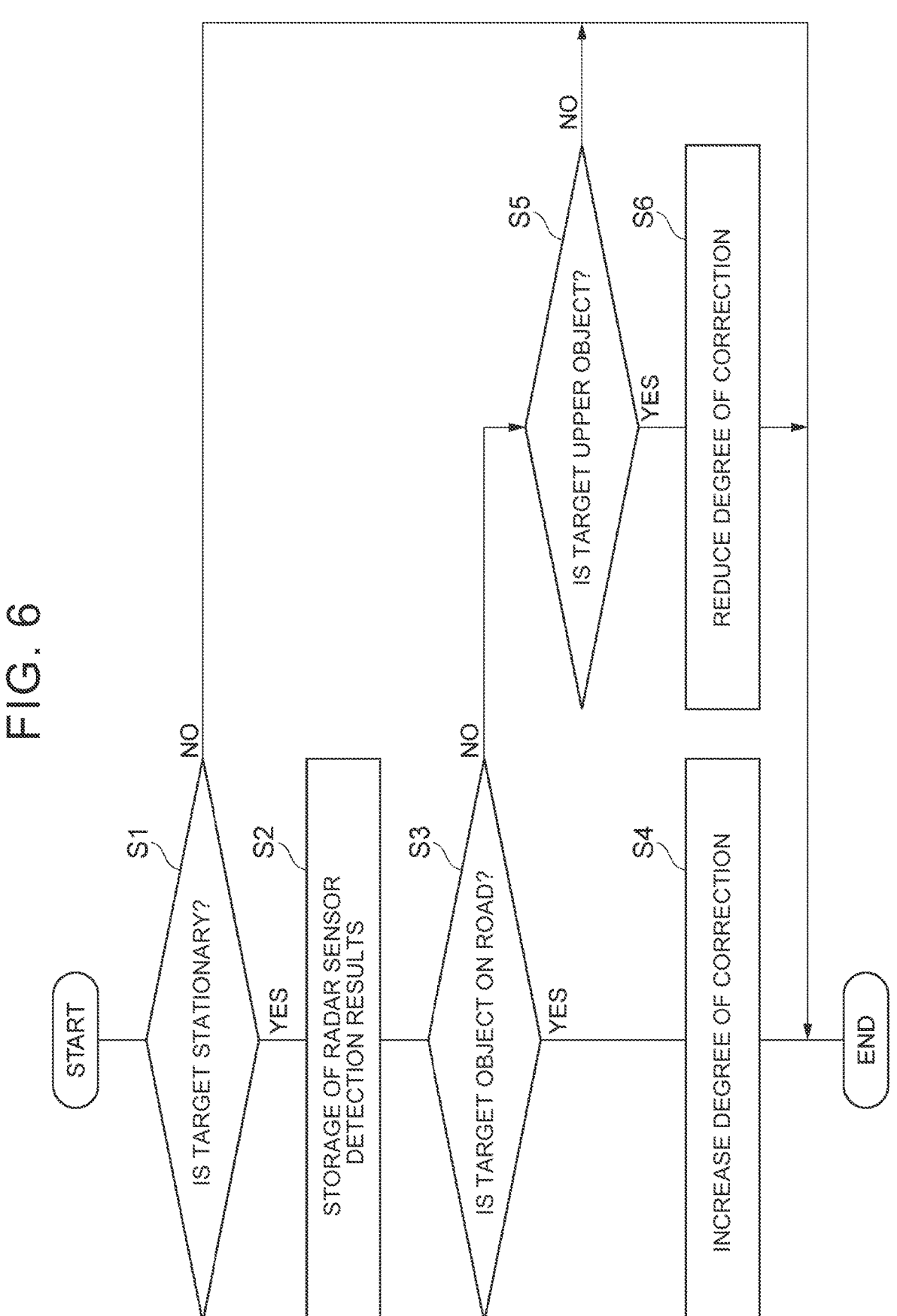
FIG. 6 is a flowchart showing processing by the vehicle speed calculation device shown in FIG. 1.

Next, processing of the ECU 10 in the vehicle speed calculation device 1 of this embodiment will be described. FIG. 6 is a flowchart showing the processing by the ECU 10. As shown in FIG. 6, the ECU 10 determines in S1 whether the fixed target 9 is a stationary object. For example, when the difference between the vehicle speed calculated by the vehicle speed calculation unit 11 and the relative vehicle speed calculated by the relative vehicle speed calculation unit 13 is equal to or less than a predetermined value, the ECU 10 determines that the fixed target 9 is a stationary object. It is determined that For example, when the difference between the vehicle speed calculated by the vehicle speed calculation unit 11 and the relative vehicle speed calculated by the relative vehicle speed calculation unit 13 is larger than a predetermined value, the ECU 10 determines that the fixed target 9 is not a stationary object (the fixed target 9 is a moving object). The predetermined value is, for example, approximately 20% of the vehicle speed calculated by the vehicle speed calculation unit 11.

When the fixed target 9 is a stationary object (S1: YES), the ECU 10 accumulates the detection results of the radar sensor 3 in S2. If the fixed target 9 is not a stationary object (S1: NO), the ECU 10 terminates this process. In S3, the ECU 10 determines whether the fixed target 9 is an object on the road. If the fixed target 9 is an object on the road (S3: YES), the ECU 10 increases the degree of vehicle speed correction using the relative vehicle speed in S4. If the fixed target 9 is not an object on the road (S3: NO), the ECU 10 determines in S5 whether the fixed target 9 is an upper object. If the fixed target 9 is an upper object (S5: YES), the ECU 10 reduces the degree of vehicle speed correction using the relative vehicle speed in S6.

As described above, the angular resolution of the radar sensor 3 in the Z-axis direction may be relatively rough. As a result of deterioration in detection accuracy of the vertical detection angle $\alpha2$ of the fixed target 9 when the fixed target 9 is an upper object, there is a possibility that the calculation accuracy of the positional relationship may decrease. When the fixed target 9 is an object on the road, the vertical distance D3 of the fixed target 9 approximates the installation height D4 of the radar sensor 3 from the road surface 7. When the fixed target 9 is an object on the road, the positional relationship calculation unit 12 calculates the reliability based on the installation height D4 of the radar sensor 3 from the road surface 7 instead of the vertical detection angle $\alpha2$ of the fixed target 9. A positional relationship with a relatively high degree is calculated. If the fixed target 9 is an upper object, the positional relationship calculation unit 12 calculates a positional relationship with a relatively low degree of reliability based on the vertical detection angle $\alpha2$ of the fixed target 9 detected by the radar sensor 3. When the fixed target 9 is an object on the road, the vehicle speed correction unit 14 increases the degree of vehicle speed correction using the relative vehicle speed compared to when the fixed target 9 is an upper object. As a result, even if the positional relationship calculation accuracy in the case where the fixed target 9 is an upper object is lowered due to a decrease in the detection accuracy of the vertical detection angle $\alpha2$ of the fixed target 9, the decrease in vehicle speed correction accuracy is suppressed. Therefore, according to the vehicle speed calculation device 1, deterioration in the correction accuracy of the vehicle speed is suppressed.

The vehicle speed calculation device 1 includes a data storage unit 15 that stores information on the received electric power by the radar sensor 3. The target category determination unit 16 selects a fixed target based on information on the received electric power P accumulated during the period until the vehicle 8 passes the fixed target 9 or until the received electric power P disappears. It is determined whether 9 is an object on the road or an upper object. Thus, the type of fixed target 9 can be determined with a simple configuration. That is, the target category determination unit 16 determines the type of the fixed target 9 after the vehicle 8 has passed the fixed target 9 or after the received electric power P has disappeared. The type of fixed target 9 can be determined without using an advanced determination method used for pre-crash safety (PCS) or the like.

The target category determination unit 16 determines that the fixed target 9 is an upper object, when the front-rear distance D1 of the fixed target 9 at the timing at which the received electric power P is lost is equal to or greater than a predetermined value, the decrease rate of the received electric power P before loss with respect to the front-rear distance D1 of the fixed target 9 is greater than or equal to a predetermined value, and the decrease rate in relative speed of the fixed target 9 with respect to the front-rear distance D1 of the fixed target 9 is greater than or equal to the predetermined value, and the fixed target 9 is present within the right-left detection range of the radar sensor 3 or the right-left distance D2 of the fixed target 9 is equal to or less than a predetermined value. This makes it possible to determine whether the fixed target 9 is an upper object with a simple configuration. That is, the target category determination unit 16 determines the type of the fixed target 9 after the vehicle 8 has passed the fixed target 9 or after the received electric power P has disappeared. Whether or whether the fixed target 9 is an upper object can be determined without using an advanced determination method used for pre-crash safety (PCS) or the like.

The radar sensor 3 is a millimeter wave radar. When the radar sensor 3 is a millimeter wave radar, the angular resolution of the radar sensor 3 in the Z-axis direction tends to be rough. Therefore, when the radar sensor 3 is a millimeter wave radar, the above-described effects are particularly remarkable.

Although the embodiments of the present disclosure have been described above, the present disclosure is not limited to the above-described embodiments. The present disclosure can be embodied in various forms with various modifications and improvements based on the knowledge of those skilled in the art, including the embodiments described above.

When the fixed target 9 is an upper object, the positional relationship calculation unit 12 calculates the vertical detection angle range of the radar sensor 3 and the positional relationship of the fixed target 9 at the timing when the fixed target 9 is lost from the vertical detection angle range. The positional relationship in the height direction between the vehicle 8 and the fixed target 9 may be calculated based on the front-rear distance D1. Specifically, the positional relationship calculation unit 12 calculates the front-rear distance D1 of the fixed target 9 based on the relative distance of the fixed target 9 at the timing when the fixed target 9 is lost from the vertical detection angle range (length of the virtual line connecting the radar sensor 3 and the fixed target 9 with a straight line) and the left-right detection angle $\alpha1$. The positional relationship calculation unit 12 calculates the following based on the front-rear distance D1 of the fixed target 9 and the maximum vertical detection angle (half of the vertical detection angle range) of the radar sensor 3 at the timing when the fixed target 9 is lost from the vertical detection angle range. A vertical distance D3 of the fixed target 9 is calculated. The timing at which the fixed target is lost from the vertical detection angle range means the timing at which the fixed target is out of the vertical detection angle range. In other words, the timing at which the fixed target is lost from the vertical detection angle range means the timing at which the fixed target no longer exists within the vertical detection angle range.

When the fixed target 9 is an upper object, the vehicle speed correction unit 14 may use 1.0 as the first correction coefficient f1 and 0.0 as the second correction coefficient f2.

That is, the vehicle speed correction unit 14 may set the degree of influence of the relative vehicle speed V2 on the vehicle speed V to zero when the fixed target 9 is an upper object.

When the fixed target 9 is an upper object, the positional relationship calculation unit 12 may calculate the positional relationship based on the vertical detection angle α2 at the timing when the front-rear distance D1 is equal to or greater than a predetermined value. As the front-rear distance D1 increases, the vertical detection angle α2 tends to decrease, and the influence of the vertical detection angle α2 on the calculation of the positional relationship tends to decrease. Therefore, by using the vertical detection angle α2 at the timing when the front-rear distance D1 is equal to or greater than a predetermined value, it is possible to improve the accuracy of calculating the positional relationship. The predetermined value for the front-rear distance D1 is a value that is predetermined based on the general height of an upper object or the like.

Assuming that the vertical detection angle α2 is sufficiently small, the positional relationship calculation unit 12 may calculate a relationship including the front-rear distance D1 of the fixed target 9 based on the relative distance of the fixed target 9 and the horizontal detection angle α1.

When the fixed target 9 is an object on the road, the reliability of the relative vehicle speed calculated by the relative vehicle speed calculation unit 13 is relatively high. Therefore, the second correction coefficient f2 may be larger than the first correction coefficient f1, for example.

The second correction coefficient f2 when the fixed target 9 is neither an upper object nor an on-road object (S5: NO) is, for example, greater than or equal to the second correction coefficient f2 when the fixed target 9 is an upper object, and It may be less than or equal to the second correction coefficient f2 when the fixed target 9 is an object on the road.

The vehicle speed correction unit 14 does not have to correct the vehicle speed calculated by the vehicle speed calculation unit 11 using the relative vehicle speed calculated by the relative vehicle speed calculation unit 13. The vehicle speed correction unit 14 may correct the vehicle speed calculated by the vehicle speed calculation unit 11 based on the relative speed of the fixed target 9 detected by the radar sensor 3 and the positional relationship. That is, the ECU 10 does not have to include the relative vehicle speed calculation unit 13.

In S2, the ECU 10 may terminate the processing without proceeding to S3, when the vehicle 8 changes course, when the radar sensor 3 is covered with a foreign object, when the received electric power P is unstable (for example, when the vehicle 8 is running in a tunnel where there are relatively many reflections that cause disturbance), when the right-left distance D2 between the radar sensor 3 and the fixed target 9 is, for example, about 2 m or more, when the amount of change in the relative speed of the fixed target 9 is, for example, 2% or more, when the road surface 7 is not flat (for example, when there is a step or a steep slope), or when the inertia force of the vehicle 8 is greater than or equal to a predetermined value, etc. In S4 or S5, the vehicle speed may be corrected only when the right-left distance D2 is equal to or less than a predetermined value (for example, about 0.9 m). Vehicle 8 may be a self-driving vehicle.

What is claimed is:

1. A vehicle speed calculation device that calculates a corrected vehicle speed of a vehicle, the vehicle speed calculation device comprising:

a radar sensor;

a wheel speed sensor; and one or more processors configured to:

determine whether a fixed target present in front of the vehicle is a road object or an upper object based on a received electric power of the radar sensor of the vehicle;

calculate a detected vehicle speed of the vehicle based on a detection result of the wheel speed sensor of the vehicle;

calculate a positional relationship between the vehicle and the fixed target based on a detection result of the radar sensor;

calculate a relative speed of the vehicle based on the calculated positional relationship; and calculate the corrected vehicle speed by correcting the detected vehicle speed based on the relative speed of the fixed target with respect to the vehicle that is detected by the radar sensor and the positional relationship, wherein;

the one or more processors are configured to calculate, when the fixed target is the road object, the positional relationship between the vehicle and the fixed target in a height direction based on an installation height of the radar sensor from a road surface;

the one or more processors are configured to calculate, when the fixed target is the upper object, the positional relationship between the vehicle and the fixed target in the height direction based on a vertical detection angle of the fixed target that is detected by the radar sensor or a vertical detection angle range of the radar sensor and a front-rear distance of the fixed target at a timing that the fixed target is lost from the vertical detection angle range; and the one or more processors are configured to increase, when the fixed target is the road object, a degree of correction of the detected vehicle speed using the relative speed and the positional relationship compared to when the fixed target is the upper object.

2. The vehicle speed calculation device according to claim 1, further comprising a data storage device that stores information on the received electric power of the radar sensor, wherein the one or more processors determine whether the fixed target is the road object or the upper object based on the information on the received electric power stored within a period until the vehicle passes the fixed target or a period until the received electric power dissipates.

3. The vehicle speed calculation device according to claim 2, wherein the one or more processors determine that the fixed target is the upper object, when:

the front-rear distance of the fixed target at a timing that the received electric power has dissipated by an amount equal to or greater than a first predetermined value;

a decrease rate of the received electric power with respect to the front-rear distance of the fixed target is equal to or greater than a second predetermined value;

a decrease rate of the relative speed with respect to the front-rear distance of the fixed target is equal to or greater than a third predetermined value, and the fixed target is present within a right-left detection range of the radar sensor; and/or a right-left distance of the fixed target is equal to or less than a fourth predetermined value.

4. The vehicle speed calculation device according to claim 1, wherein the radar sensor is a millimeter wave radar.

5. A method for calculating a corrected vehicle speed, the method comprising the steps of:

determining whether a fixed target present in front of a vehicle is a road object or an upper object based on a received electric power of a radar sensor of the vehicle;

calculating a detected vehicle speed of the vehicle based on a detection result of a wheel speed sensor of the vehicle;

calculating a positional relationship between the vehicle and the fixed target based on a detection result of the radar sensor;

calculating a relative speed of the vehicle based on the calculated positional relationship; and calculating the corrected vehicle speed by correcting the detected vehicle speed based on the relative speed of the fixed target with respect to the vehicle that is detected by the radar sensor and the positional relationship, wherein:

when the fixed target is the road object, calculating the positional relationship between the vehicle and the fixed target in a height direction based on an installation height of the radar sensor from a road surface;

when the fixed target is the upper object, calculating the positional relationship between the vehicle and the fixed target in the height direction based on a vertical detection angle of the fixed target that is detected by the radar sensor or a vertical detection angle range of the radar sensor and a front-rear distance of the fixed target at a timing that the fixed target is lost from the vertical detection angle range; and when the fixed target is the road object, increasing a degree of correction of the detected vehicle speed using the relative speed and the positional relationship compared to when the fixed target is the upper object.

6. The method according to claim 5, further comprising storing information on the received electric power of the radar sensor, wherein the determination of whether the fixed target is the road object or the upper object is based on the information on the received electric power stored within a period until the vehicle passes the fixed target or a period until the received electric power dissipates.

7. The method according to claim 6, wherein the determination that the fixed target is the upper object is made when:

the front-rear distance of the fixed target at a timing that the received electric power has dissipated by an amount equal to or greater than a first predetermined value;

a decrease rate of the received electric power with respect to the front-rear distance of the fixed target is equal to or greater than a second predetermined value;

a decrease rate of the relative speed with respect to the front-rear distance of the fixed target is equal to or greater than a third predetermined value, and the fixed target is present within a right-left detection range of the radar sensor; and/or a right-left distance of the fixed target is equal to or less than a fourth predetermined value.

8. The method according to claim 5, wherein the radar sensor is a millimeter wave radar.

9. A non-transitory computer-readable storage medium, the non-transitory computer-readable storage medium including instructions that when executed by circuitry causes the circuitry to:

determine whether a fixed target present in front of a vehicle is a road object or an upper object based on a received electric power of a radar sensor of the vehicle;

calculate a detected vehicle speed of the vehicle based on a detection result of a wheel speed sensor of the vehicle;

calculate a positional relationship between the vehicle and the fixed target based on a detection result of the radar sensor;

calculate a relative speed of the vehicle based on the calculated positional relationship; and calculate a corrected vehicle speed by correcting the detected vehicle speed based on the relative speed of the fixed target with respect to the vehicle that is detected by the radar sensor and the positional relationship, wherein:

when the fixed target is the road object, the calculation of the positional relationship between the vehicle and the fixed target in a height direction is based on an installation height of the radar sensor from a road surface;

when the fixed target is the upper object, the calculation of the positional relationship between the vehicle and the fixed target in the height direction based on a vertical detection angle of the fixed target that is detected by the radar sensor or a vertical detection angle range of the radar sensor and a front-rear distance of the fixed target at a timing that the fixed target is lost from the vertical detection angle range; and when the fixed target is the road object, a degree of correction of the detected vehicle speed using the relative speed and the positional relationship compared to when the fixed target is the upper object is increased.

10. The non-transitory computer-readable storage medium according to claim 9, wherein the non-transitory computer-readable storage medium further includes instructions that when executed by the circuitry causes the circuitry to:

store information on the received electric power of the radar sensor; and determine whether the fixed target is the road object or the upper object based on the information on the received electric power stored within a period until the vehicle passes the fixed target or a period until the received electric power dissipates.

11. The non-transitory computer-readable storage medium according to claim 10, wherein the non-transitory computer-readable storage medium further includes instructions that when executed by the circuitry causes the circuitry to determine that the fixed target is the upper object, when:

the front-rear distance of the fixed target at a timing that the received electric power has dissipated by an amount equal to or greater than a first predetermined value;

a decrease rate of the received electric power with respect to the front-rear distance of the fixed target is equal to or greater than a second predetermined value;

a decrease rate of the relative speed with respect to the front-rear distance of the fixed target is equal to or greater than a third predetermined value, and the fixed target is present within a right-left detection range of the radar sensor; and/or a right-left distance of the fixed target is equal to or less than a fourth predetermined value.

12. The non-transitory computer-readable storage medium according to claim 9, wherein the radar sensor is a millimeter wave radar.

* * * * *